United States Patent [19]

Cooke

[11] 4,020,340
[45] Apr. 26, 1977

[54] PRECISION AUTOMATIC TRACKING SYSTEM

[75] Inventor: Claude R. Cooke, San Jose, Calif.

[73] Assignee: GTE Sylvania Incorporated, Mountain View, Calif.

[22] Filed: Aug. 11, 1975

[21] Appl. No.: 603,601

Related U.S. Application Data

[63] Continuation of Ser. No. 126,664, March 22, 1971, abandoned.

[52] U.S. Cl. .................. 250/203 R; 250/209; 250/216
[51] Int. Cl.² ............................................ G01J 1/20
[58] Field of Search .......... 250/202, 203, 578, 208, 250/209, 216; 350/188; 331/94.5

[56] References Cited
UNITED STATES PATENTS

| | | | |
|---|---|---|---|
| 3,260,849 | 7/1966 | Polye | 250/203 |
| 3,290,505 | 12/1966 | Stavis | 250/203 |
| 3,296,444 | 1/1967 | Wilson | 250/203 |
| 3,470,377 | 9/1969 | Le Febre et al. | 250/203 |
| 3,514,608 | 5/1970 | Whetter | 250/203 |

Primary Examiner—David C. Nelms
Attorney, Agent, or Firm—John F. Lawler; Theodore C. Jay, Jr.; Norman J. O'Malley

[57] ABSTRACT

An optical tracking system for aircraft and the like which measures positional variations of a portion of a laser transmitter pulse train or beam returned from a tracked object to derive error signals for energizing the tracking servo mechanism. In particular, the system detects such beam position change by measuring variations in energy received by a quadrant-segmented photo sensor relative to the sensor axis of symmetry. Compensation for scintillation (variation with time of the spatial intensity distribution) of the return beam due to change in the index of refraction of the atmosphere is achieved, in accordance with the invention, by focusing the return beam to a small diameter and passing it through a diffusing medium such as opal glass or a fiber optic bundle. The energy in the output beam from this medium is homogeneous and substantially invariant with time so that tracking error due to scintillation is eliminated.

1 Claim, 4 Drawing Figures

INVENTOR.
CLAUDE R. COOKE
BY
John F. Lawler
ATTORNEY

PRECISION AUTOMATIC TRACKING SYSTEM

This is a continuation of application Ser. No. 126,664, filed Mar. 22, 1971, now abandoned.

BACKGROUND OF THE INVENTION

This invention relates to optical tracking systems and more particularly to an automatic precision laser tracking system for aircraft and the like.

An automatic tracking system to which this invention is directed utilizes a pulsed laser as an energy transmitter and, in addition to determining range by timing the return of reflected pulses as in a radar unit, measures changes in the position of the axis of the stream or beam of return pulses relative to a stationary reference element. In this manner error signals of the proper magnitude and sense are generated for causing the transmitted pulse train to track the target. A typical reference element is an optical sensor such as a silicon photodiode which is symmetrically segmented in quadrants about a central axis. When the axis of the return pulse train coincides with the axis of symmetry of the photodiode, the energy outputs from the diode segments are equal and no error signal is produced. When the incident pulse train axis of offset from the diode axis, the diode segment outputs are unequal and constitute an error signal of the proper magnitude and sense from which a servo drive signal is derived for keeping the transmitter pulses on target. The servo system may drive mirrors for this purpose.

A difficulty with this tracking system is spurious error signals from scintillation of the optical beam as a result of atmospheric turbulence. The turbulence consists of fluctuations in the refractive index of the air which are caused by temperature variations and gradients. Such scintillation causes the diode segments to produce significant output error signals when the beam and diode axes are coincident and results in inaccurate tracking data as well as instability, jitter and oscillations in the servo system. Such errors are especially critical when the optical tracking system is used to calibrate instruments in the aircraft and ground stations.

An object of this invention is the provision of an optical tracking system in which scintillation of the laser beam is automatically compensated.

Another object is the provision of a precision automatic tracking system with the combination of an energy distribution sensor for producing tracking error signals and an optical diffusing medium for essentially eliminating time-variant energy distribution in the laser beam.

SUMMARY OF THE INVENTION

Variations in intensity distribution in the cross section of a laser tracking beam with time is compensated, in accordance with this invention, by reduction of the diameter of the beam, and passing the reduced beam through an optical diffusing or scattering medium and reimaging the output beam on the segmented photosensitive diode. The energy distribution in the beam spot on the diode is thus made homogeneous with time and tracking error from scintillation is substantially eliminated.

DESCRIPTION OF PREFERRED EMBODIMENT

Figure 1:
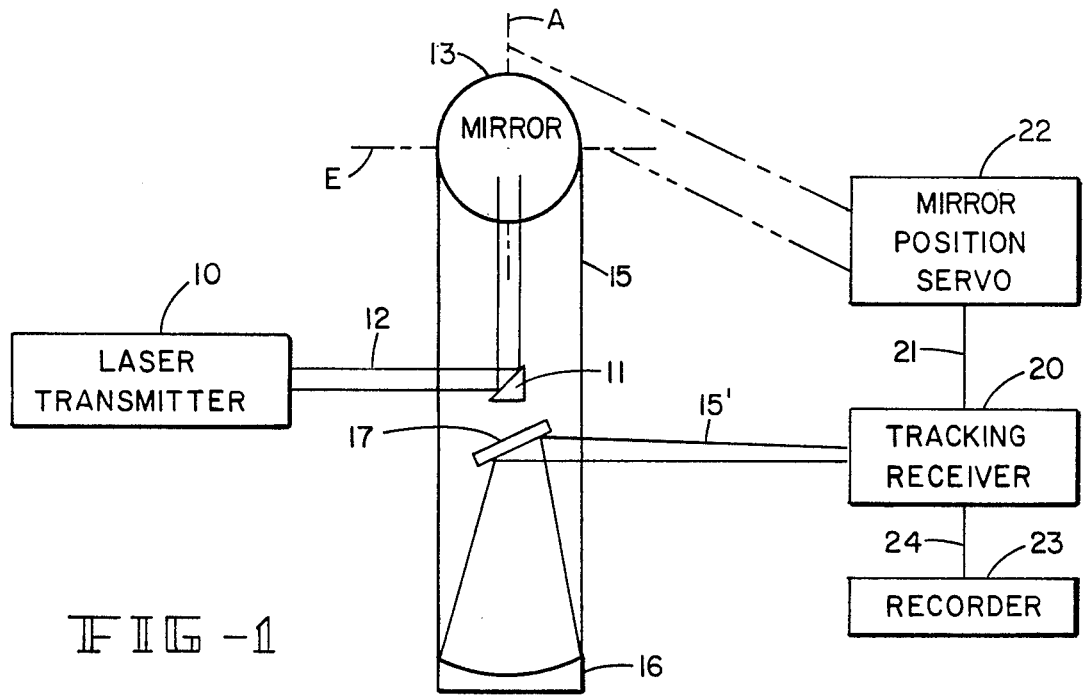
FIG. 1 is a simplified schematic view of an optical tracking system of the type with which this invention may be practiced.

Referring now to FIG. 1, a laser tracking system of the type with which the invention may be practiced comprises a laser transmitter 10 and a stationary transmitter mirror 11 which directs the laser output beam 12 to a tracking mirror 13 supported for movement about an azimuth axis A and an elevation axis E. The term "mirror" denotes any element which functions to change the direction of a light beam and may include refracting as well as reflecting media. Transmitter 10, by way of example, may be a Q-switched, flash-pumped neodymium yttrium aluminum garnet (Nd:YAG) laser with 1.06 micrometer radiation and operating at 100 pulses per second.

Tracking mirror 13 directs transmitter beam 12 to the target such as an aircraft, and also receives the return or tracking beam 15 from the aircraft. To enhance the return signal, the aircraft preferably carries an external retroreflector assembly to which the transmitter beam is directed. Beam 15 is received and reduced by stationary receiver mirrors 16 and 17 and is directed by the latter as bean 15' into tracking receiver 20 which processes the tracked beam and develops an error signal on output line 21 when the axis of the tracked beam deviates from a reference axis as explained below. Mirror position servo mechanism 22 receives the error signal output on line 21 from receiver 20 and drives mirror 13 in tracking movements about azimuth axis A and elevation axis E in accordance with the direction and magnitude of position error signals. Thus mirror 13 automatically tracks the aircraft. A recorder 23 also receives an output from receiver 20 on line 24 for making a permanent record of the tracking operation.

Figure 2:
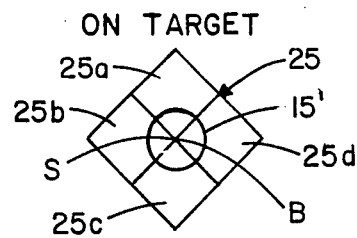
FIGS. 2 and 3 are diagrams illustrating positions of the tracking beam spot on a segmented photo sensor (photodiode) such that the beam axis is coincident with and is offset from the sensor axis, respectively.
Figure 3:
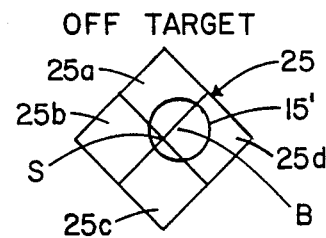

Referring now to FIGS. 2 and 3, rectangle 25 designates a photo sensor such as a photodiode having four electrically separate segments 25a–25d, inclusive, of equal size symmetrically positioned about the diode sensor axis S. Circle 15' represents the image of the receiver input beam incident upon sensor 25 and has an axis designated B. When the focal axis of mirror 13 intersects the target (retroreflectors on the tracked aircraft), axis B of beam 15' coincides with the aixs S of the segmented sensor as shown in FIG. 2 and the outputs of the four segments of the sensor 25 are equal. This is the "on target" state of the system in which no error signal is generated by the receiver. When the axial alignment of mirror 13 relative to the tracked target is such that the axis B of beam 15' is offset from sensor axis S as shown in FIG. 3, the system is said to be "off target" and the outputs of two or more of the sensor segments are unequal. Under these conditions, an error signal is developed in receiver 20 and is fed to the servo mechanism 22 by line 21 so as to move mirror 13 back on target.

Figure 4:
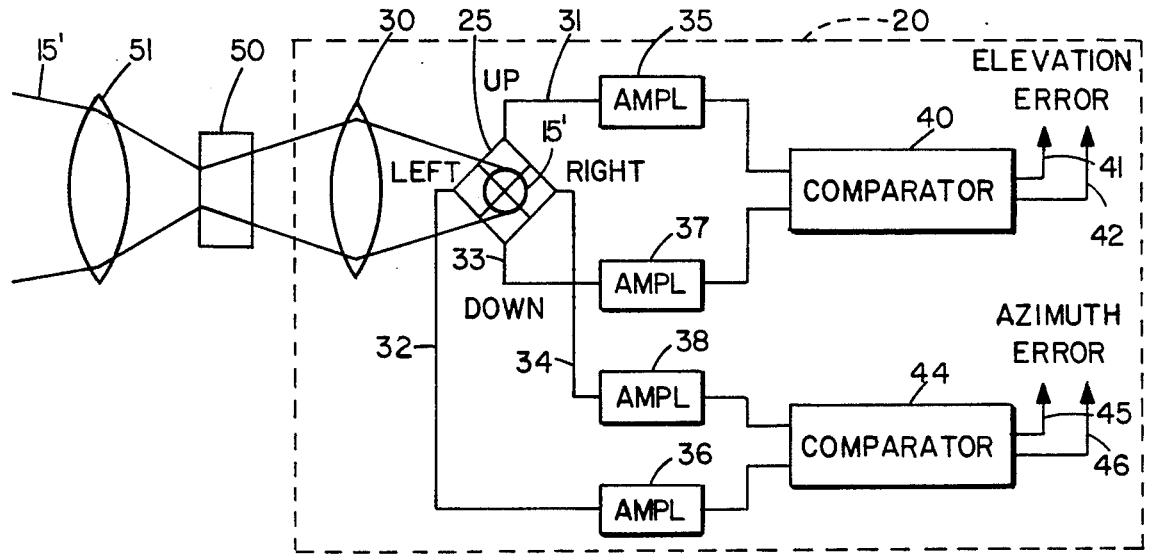
FIG. 4 is a simplified schematic diagram of the tracking receiver showing an input beam processed in accordance with the invention.

A simplified diagram of receiver 20 is shown in FIG. 4 and comprises a focus lens 30 which directs the received beam 15' onto the segmented photo sensor 25. The outputs of sensor segments 25a–25d are fed by lines 31, 32, 33 and 34 to amplifiers 35–38, respectively. The outputs of amplifiers 35 and 37 are fed to comparator 40 which produces outputs on lines 41 and 42 for displacing mirror 13 in elevation in proportion to the magnitude and sense of the error signal generated. Similarly, the outputs of amplifiers 36 and 38 are fed to comparator 44 which, when beam axis B moves to the left or right of sensor axis S, produces outputs on lines 45 and 46 which cause servo mechanism 22 to produce a compensating change in the azimuth position of mirror 13. Output lines 41, 42, 45 and 46 are collectively indicated as line 21 in FIG. 1.

The foregoing description relates to prior art techniques for optically tracking targets. As mentioned above, turbulence and temperature induced changes in the physical properties of the air produces scintillation in beam 15' incident on sensor 25. As a consequence, error signals are developed by receiver 20 in spite of the fact that sensor and beam axes S and B are coincident as shown in FIG. 2. In accordance with this invention, such scintillation in the received beam is substantially eliminated by disposition of an optical diffusing or scattering medium 50, such as a fiber optic bundle or opal glass or frosted glass, in the path of input beam 15' to the receiver as shown in FIG. 4. More particularly, a lens 51 focuses beam 15' from mirror 17 into a spot of reduced area or size, preferably about 0.1 to 1.0 mm in diameter, on diffusing medium 50. This concentrated beam is diffused as it passes through medium 50 and is reimaged by receiver lens 30 on sensor 25 for processing as described above. The effect of passing the size-reduced beam through the diffusing medium is to essentially produce a homogeneous distribution of energy across the beam. As a consequence, the distribution of energy across the beam spot on sensor 25 is substantially time invariant and tracking errors due to scintillation are eliminated.

By way of example, a laser tracking system of the type described above but not employing this invention tracks an aircraft at a range of 50,000 feet with an error of ±25 feet due in part to scintillation. When modified in accordance with this invention, the system tracks an aircraft at the same range with an error of approximately 2.5 feet.

I claim:
1. An automatic system for optically tracking a remote target in the atmosphere comprising
   an optical transmitter adapted to generate optical pulses,
   means for directing said pulses as a beam through the atmosphere to said target for reflection therefrom, the energy intensity distribution in said pulses being subjected to substantial changes during transmission through the atmosphere due to variations in optical characteristics of the media comprising the atmosphere whereby the reflected pulses are characterized by atmospherically induced variations of spatial energy intensity distribution (scintillation),
   a receiver having a photosensitive transducer with a plurality of electrically separate segments symmetrically arranged about the transducer axis, each segment being responsive to the magnitude of photon energy in said reflected pulses and producing an electrical output proportional to said energy,
   means for comparing the outputs of said segments for deriving a tracking error signal when the optical axis of the reflected pulse beam is displaced from the transducer axis,
   means for compensating for said scintillation in the received reflected pulses comprising
      an optical diffuser located in the path of the received pulses adjacent to and on the input side of said transducer for diffusing said received pulses prior to incidence upon said transducer whereby to reduce the effect on said transducer of scintillation in said reflected pulse beam, and
      a reducing lens adjacent to the optical input side of said diffuser for reducing the area of incidence of the reflected pulse beam on said diffuser.

* * * * *